May 15, 1934.  J. E. PETERSON  1,958,675
STOP MOTION FOR DYEING MACHINES
Filed June 11, 1931   3 Sheets-Sheet 1

INVENTOR,
John E. Peterson,
BY his ATTORNEY

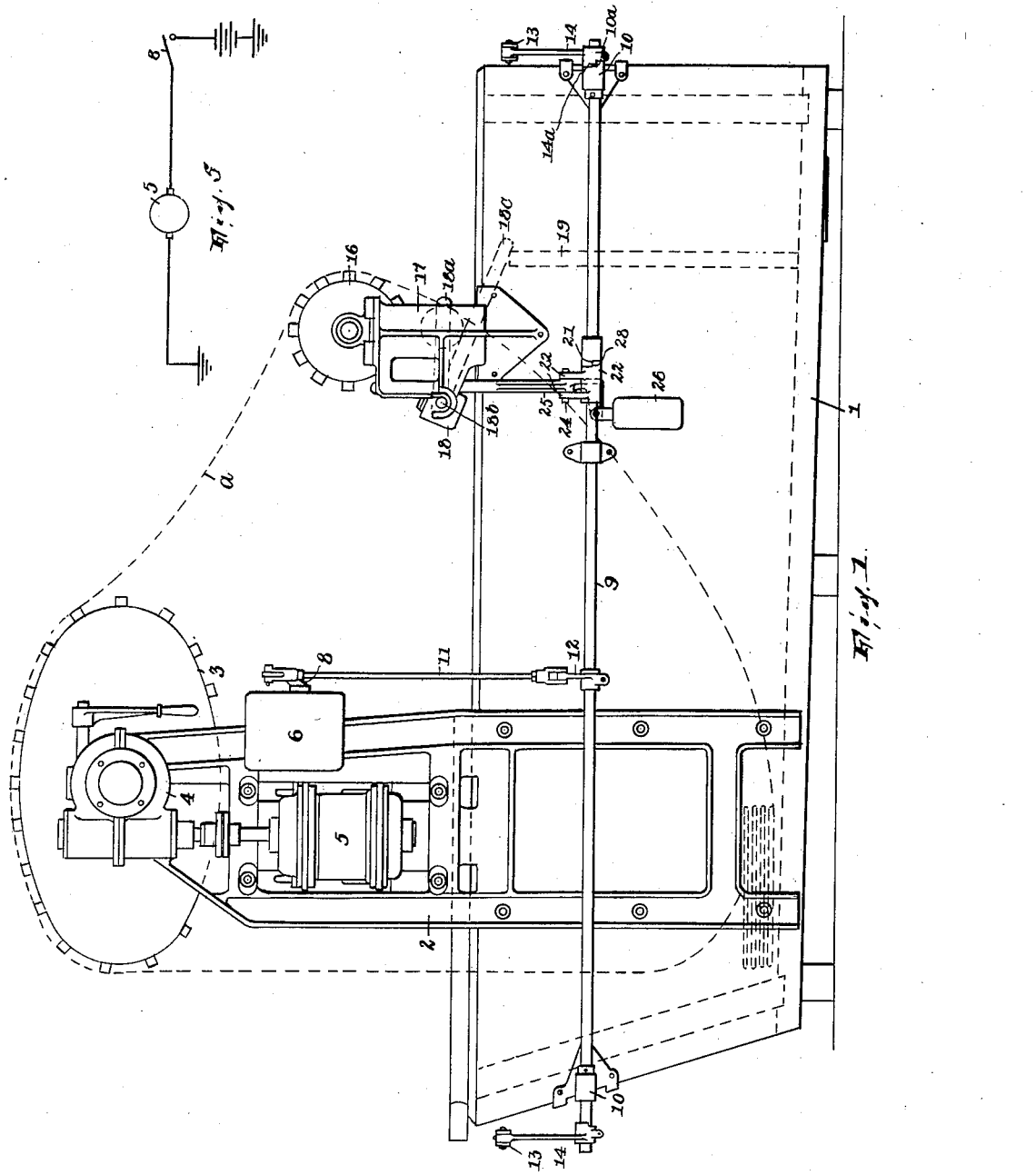

Patented May 15, 1934

1,958,675

UNITED STATES PATENT OFFICE 1,958,675

STOP MOTION FOR DYEING MACHINES

John E. Peterson, Irvington, N. J., assignor to The Van Vlaanderen Machine Company, Paterson, N. J., a corporation of New Jersey Application June 11, 1931, Serial No. 543,563

5 Claims. (Cl. 192—125)

This invention relates to dyeing machines of the class embodying a rotated reel for advancing textile material, as fabric, through the dye liquor in the vat of the machine and usually embodying means, as a so-called rake, which when moved by the fabric from one given position to another due to the fabric catching against the rake, causes stopping of the reel. The object of the invention is to provide simple means whereby when the rake is thus moved the power will be cut off and whereby the operator has notice on attempting to start the machine if the rake has not been first replaced to detecting position.

In the drawings,

Fig. 3 shows the rake and a certain-impact means and the control-member in side elevation, and parts of the supporting means in section;

Fig. 4 is a fragmentary plan of the rake; and

Fig. 5 shows the electric circuit containing the motor for driving the reel of the machine.

Figure 1:
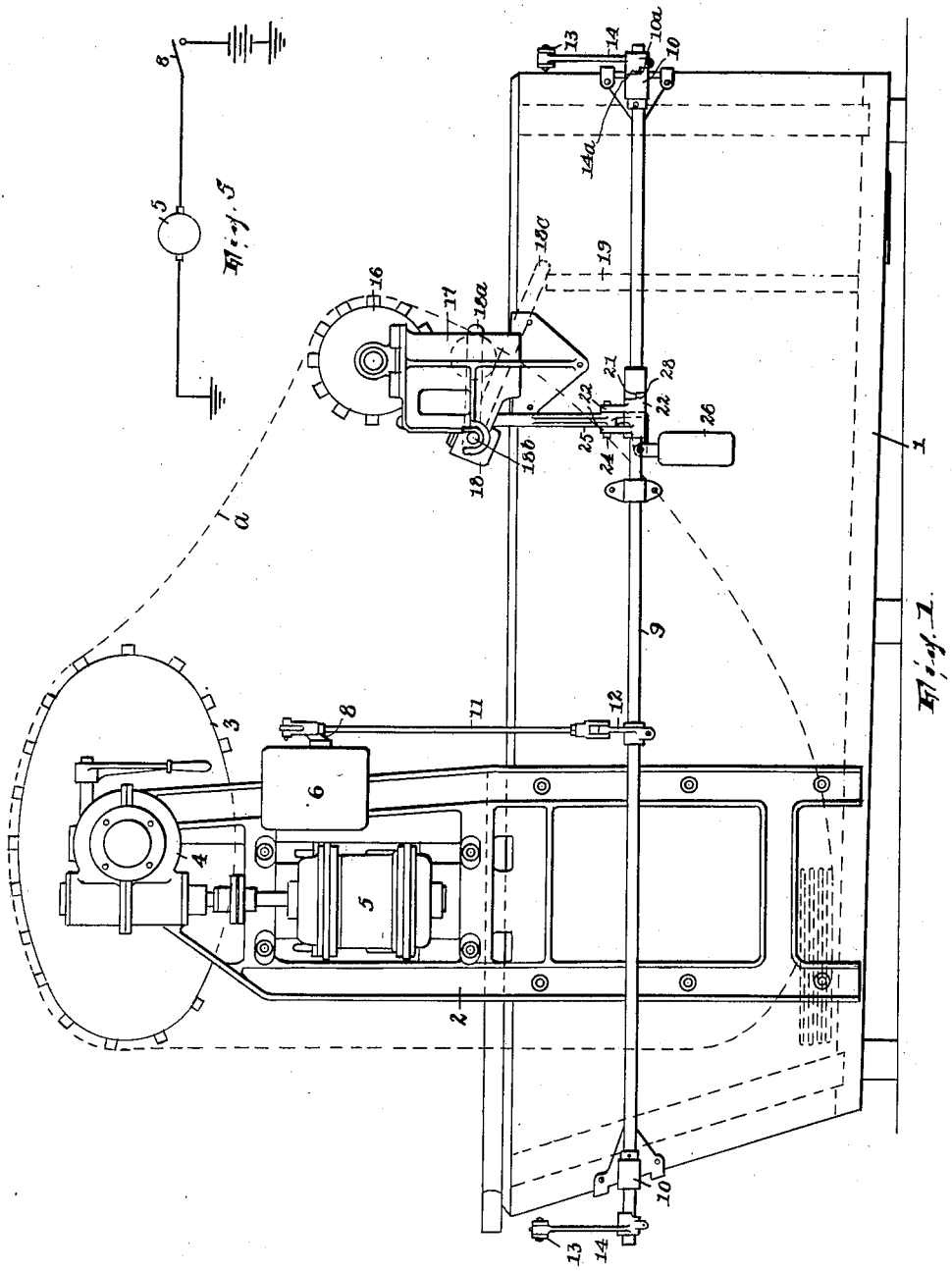
Fig. 1 is a side elevation of the improved dyeing machine.

Supporting means is afforded by a dye-vat 1 having the fixed standards 2 in which is journaled the shaft of the main reel 3 adapted to be driven, through gearing contained in the housing 4, from an electric motor 5.

Means to apply driving power to or cut off the power from the reel comprises, with the motor, a switch-box 6 having a switch 8 for the circuit in which the motor is contained (see Fig. 5), a rock-shaft 9 forming a control-member and journaled in bearings 10 at the side of the vat, a pitman 11 pivotally connecting the switch with a crank 12 on the rock-shaft, and hand-rails 13 pivotally connected to cranks 14 on the rock-shaft and slidable in guides 15 at the ends of the vat. Viewing the control member 9 from its right-hand end in Fig. 1, anti-clockwise movement to close the switch and start the reel rotating may be limited by contact of an abutment 14a on one crank 14 with abutment 10a of one bearing 10; clockwise movement to open the switch and stop the reel may be limited by contact of the hand-rails at 13a with the near guide 15.

The goods or material to be treated is in the form of so-called "ropes" a which extend around the reel 3 and also around a smaller and freely rotating reel 16 journaled in brackets 17 on the vat (and forming an additional part of the mentioned supporting means) and which trail through the liquor in the vat when the reel 3 is driven. As is usually the case, there is a rake 18 weighted at 18a and whose gudgeons 18b are journaled in the brackets 17 and between whose tines 18c the various ropes extend, said brake normally resting in the position of Fig. 1 on partition 19 of the vat and being adapted to tilt upwardly against some stop, as the reel 16, if any rope forms into a snarl or enlargement that cannot pass easily between its tines. On one of the gudgeons is a cam 20.

The control member or rock-shaft has a substantially radial abutment 21, which may be a part of a collar fixed thereon, and freely oscillatory on the rock-shaft is a crank 22 having two arms 22a in which on a pin 24 is fulcrumed a bell-crank lever or latch 25 one arm of which projects horizontally and carries a weight 26 and the other of which projects upwardly and forms a hook 25a, said lever being pivoted on the pin 24 to move not only around the same but parallel with the rock-shaft due to its pin-receiving bore being tapered at both ends as shown by dotted lines at 25b in Fig. 3. The hook of this latch lies in the plane of movement of the cam 20 and when by movement of the crank 22 to lift the weight the latch is elevated with the cam in the position of Fig. 3 its hook may catch, by the action of the weight 26 to tilt the latch, on a projection 27 of the bracket 17 to hold the crank and latch elevated against the downward pull of said weight. The crank 22 has a substantially radial abutment 28 to impinge against abutment 21 of the rock-shaft. The crank, weight and latch form impact means normally urged (by the weight) against the control member at 21.

Figure 2:
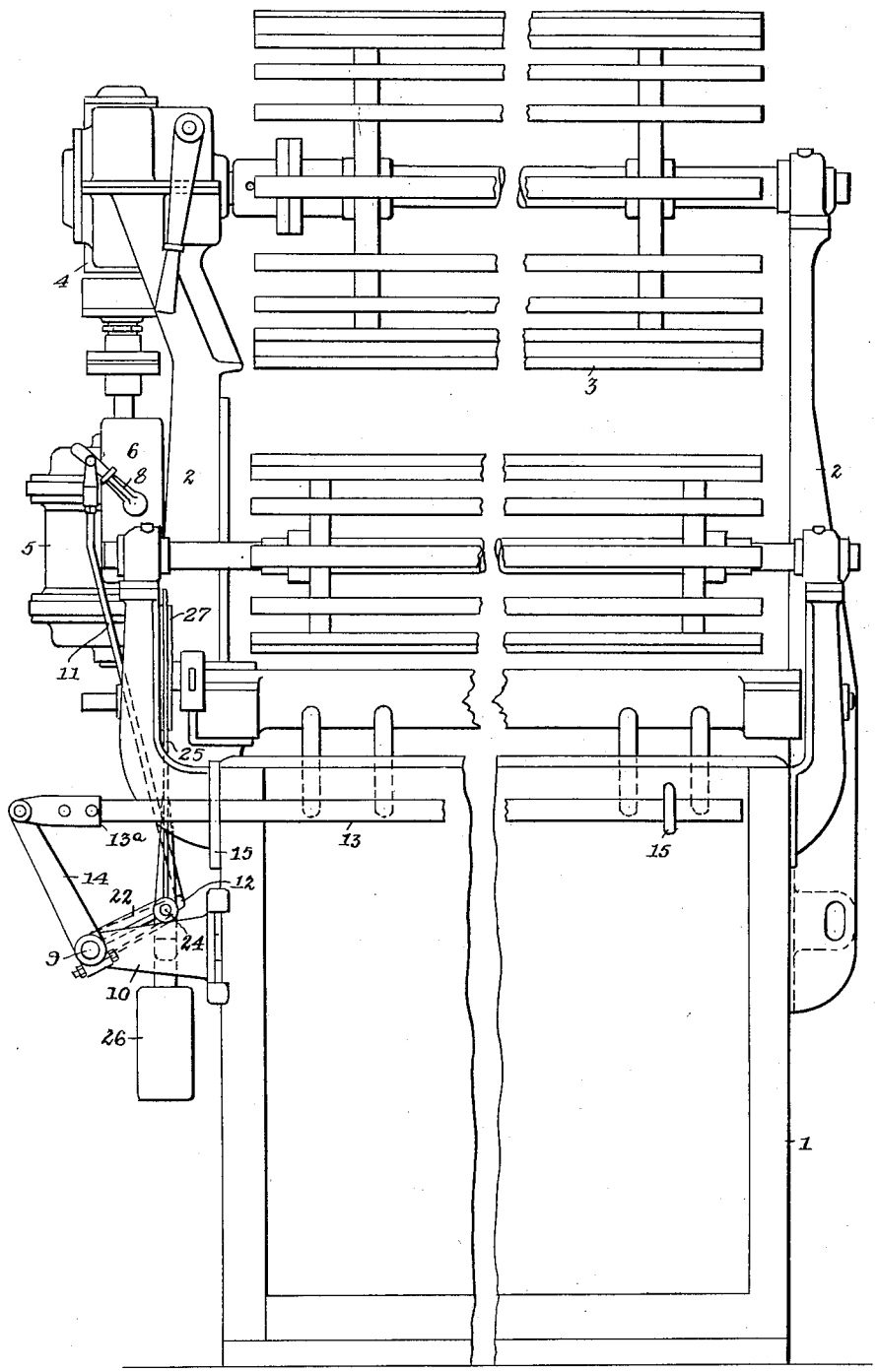
Fig. 2 is a right-hand end elevation thereof.

*Operation.*—To start the machine the attendant first depresses the means 18—20 to the position of Fig. 1, so that the cam 20 is retracted. The control member or rock-shaft is then shifted anti-clockwise (Fig. 2) by one of the hand-rails, which closes the switch and by contact of abutment 21 with abutment 28 of crank 22 elevates the impact means until it is caught and held by projection 27. (The operator may now stop the machine by hand at any time by shifting either hand-rail back, leaving the impact means still caught and held elevated.) If when the machine is running one of the ropes should cause the means 18—20 to tilt upwardly the cam 20 will unship the latch 25 clear of projection 27, so that the weight causes the impact means to descend and by engagement of its abutment 28 with the abutment 21 of the rock-shaft shift the rock-shaft clockwise, stopping the machine and of course returning the hand-rails to their original positions. If the means 18—20 is up-tilted at the time the rock-shaft is moved to start the machine, the impact means being therefore already depressed and impinging against the rock-shaft at 21, the resistance due to the weight will afford notice to the operator that said means is not in detecting position and further the control member will not remain locked in the starting position.

In one aspect of the invention parts 9—12—11—8 may be regarded as forming, with 22—26, means to control rotation of the reel movable in one direction to start and in the other direction to stop the reel and normally urged (by 22—26) in the latter direction; and parts 25—27—18 as means to releasably hold the first means against movement in the second direction including a device (18) movable by the material being advanced to cause this means to release said first means.

Having thus fully described my invention what I claim is:

1. In combination, supporting means, a driven reel journaled therein, means to apply driving power to or cut off the power from the reel including a control member movable in one direction to apply and in the other direction to cut off the power, an impact means normally urged against said member to move the latter in the second direction, said impact means being engagable with the supporting means and when so engaged held thereby against movement toward said member, and means, actuated by the material advanced by the reel, for disengaging the impact means from said supporting means.

2. In combination, supporting means, a driven reel journaled therein, means to apply driving power to or cut off the power from the reel including a rock-shaft rotative in one direction to apply and in the other direction to cut off the power, an impact means normally urged against the rock-shaft to rotate the latter in the second direction, said impact means being engageable with the supporting means and when so engaged held thereby against movement toward the rock-shaft, and means, actuated by the material being advanced by the reel, for disengaging the impact means from said supporting means.

3. In combination, supporting means, a driven reel journaled therein, means to apply driving power to or cut off the power from the reel including a rock-shaft rotative in one direction to apply and in the other direction to cut off the power, an impact member journaled on and normally urged against the rock-shaft to rotate the latter in the second direction, a latch to disconnectively couple said impact member and the supporting means and hold the former against movement against the rock-shaft, and means, actuated by the material being advanced by the reel, for moving said latch out of its coupling relation to the impact member and supporting means.

4. In combination, supporting means, a driven reel journaled therein, means to apply driving power to or cut off the power from the reel including a rock-shaft rotative in one direction to apply and in the other direction to cut off the power, an impact member journaled on and normally urged against the rock-shaft to rotate the latter in the second direction, a latch pivoted to the impact member to move in a plane substantially parallel with the rock-shaft and normally urged pivotally in one direction toward and adapted to catch on a part of the supporting means and hold the impact member against movement against the rock-shaft, and means, actuated by the material advanced by the reel, for moving said latch pivotally in the other direction and thereby disengaging it from the supporting means.

5. In combination, with a supporting structure, a reel journaled therein, means to control the rotation of the reel movable in one direction to start and in the other direction to stop the reel and normally urged in the second direction, and means to releasably hold the first means against movement in the second direction including a device movable by the material being advanced by the reel to cause the second means to release the first means.

JOHN E. PETERSON.